United States Patent [19]

Harrewijne et al.

[11] 3,830,254
[45] Aug. 20, 1974

[54] NON-RETURN VALVE

[75] Inventors: Arend Harrewijne; Jacobus Hubertus Abrahams, both of Emmasingel, Eindhoven, Netherlands

[73] Assignee: U.S. Philips Corporation, New York, N.Y.

[22] Filed: Feb. 21, 1973

[21] Appl. No.: 334,468

[30] Foreign Application Priority Data
Feb. 25, 1972 Netherlands................. 722535

[52] U.S. Cl............. 137/540, 137/543.17, 251/333, 251/364
[51] Int. Cl........................................ F16k 15/12
[58] Field of Search ........... 251/364, 332, 333, 359; 137/516, 516.29, 540, 541, 543.17

[56] References Cited
UNITED STATES PATENTS

| 874,652 | 12/1907 | Bailey | 137/516.29 |
|---|---|---|---|
| 2,350,905 | 6/1944 | Koehler | 251/364 X |
| 2,608,376 | 8/1952 | Adams | 137/516.29 |
| 2,621,885 | 12/1952 | Schmitt | 251/DIG. 1 |
| 2,929,401 | 3/1960 | Cowan | 137/516.29 |
| 2,994,340 | 8/1961 | Biello et al. | 251/364 X |
| 3,378,030 | 4/1968 | Cary | 137/516.29 |
| 3,618,893 | 11/1971 | Bois | 251/364 X |

*Primary Examiner*—Henry T. Klinksiek
*Attorney, Agent, or Firm*—Frank R. Trifari

[57] ABSTRACT

A non-return valve of which the seating ring projecting above the seat and manufactured from a plastically deformable material and having a flat seating surface in the starting condition, has a thickness measured normal to the axis which increases when moving in the axial direction from the seating surface toward the seat in such manner that simultaneously the inner diameter of the ring decreases and the outer diameter of the ring increases. The seating surface experiences a permanent increase in area as a result of plastic deformation of the ring by the flat side of the valve body of a harder material when the closing pressure of the valve exceeds a given minimum value.

5 Claims, 2 Drawing Figures

NON-RETURN VALVE

BACKGROUND OF THE INVENTION

The invention relates to a non-return valve comprising a valve seat which is provided with a projecting seating ring and a valve body which is flat on the side facing the seat and cooperates on said side with a flat seating surface of the ring. The ring is manufactured from a material which has hardness of less magnitude than the material of the valve body, which valve body closes the valve under the influence of a closing pressure.

The closing pressure which ensures that the valve body becomes to engage the seating surface of the ring is supplied by a spring (spring-loaded non-return valve) and/or by a medium pressure on the valve body during operation of the valve in a medium duct.

In a valve of the present type known from the U.S. Pat. No. 1,424,094 the seating ring consists of a flexible material (rubber or the like) and the cross-section of the ring has a rectangular profile. This known valve is not suitable for use in systems in which high pressures prevail with great pressure differentials and pressure variations, respectively, across the valve. The flexible seating ring cannot withstand these differences and variations and is simply forced away. Nor is this valve suitable in systems in which comparatively high temperatures occur. The flexibility of the ring disappears and the ring begins to crumble away as a result of which the valve does no longer close properly and becomes useless. Furthermore, a few other drawbacks are associated with the so far known non-return valves in which the ring is formed integral with and is manufactured from the same material as the seating, as a result of which they are less suitable for certain applications or are even useless. The closing time of spring-loaded non-return valves is comparatively long. A shorter closing time is obtained in principle by using springs having a great spring rigidity under high pretension. However, this results in high closing speeds. As a result of the consequently occurring great forces of impact between the valve body and the softer seating surface of the ring, said ring is deformed in such manner that the valve does no longer close readily and the material of the ring easily crumbles away. The choice must then be made between a valve having a short lifetime or a valve having a comparatively long closing time in that a comparatively slack spring is used to restrict the forces of impact. Both alternatives are unattractive.

A further drawback of the known non-return valves is their comparatively great leak in the closed condition. This leak increases in the course of the life as a result of the unfavorable deformation and crumbling away of the seating ring. An example of an application in which the described drawbacks make themselves felt most prominently is the power control system of a hot-gas engine, which is an engine in which a working medium performs a thermodynamic cycle under high pressure (for example 100 atm) in a closed working space. In this case the power is varied by controlling the average working medium pressure in the working space. The control system comprises non-return valves which must satisfy the following high requirements: very short closing time, very small leak, resistance to high closing pressures and large pressure variations.

In order to reduce the engine power, working medium is compressed from the working space of the engine into a high pressure storage container by means of a control compressor incorporated in an outlet duct. Increasing the power is effected by supplementing working medium from the storage container via an inlet duct to the working space of the engine (see, for example, U.S. Pat. No. 3,546,877). Spring-loaded non-return valves are present in the inlet and outlet ducts and in the control compressor as well as the inlet and outlet valves. Owing to high working medium pressures and large pressure variations in the working space of the engine and the compressor, all non-return valves must be capable of withstanding high pressures and large pressure variations.

In order to be able to rapidly control the engine power, the control compressor must rotate at a high number of revolutions. The inlet and outlet valves of the compressor must thus have a very short closing time. Very great forces of impact occur between the valve body and the seating surface of the ring not only by the consequently required use of springs having a high spring rigidity and high pretension but also and in particular because the high pressure working medium causes high closing speeds.

A very small leak of the non-return valve in the inlet and outlet ducts is required for the following reason.

When the engine is in normal operation while the power control system is out of operation, the danger exists that working medium leak occurs from the working space to the control system, or conversely. The engine power then varies, which is undesirable.

It is an object of the present invention to avoid the above-described drawbacks by providing a non-return valve which combines the properties of a short closing time, a minimum leak and a long lifetime.

SUMMARY OF THE NEW INVENTION

The invention is based on the recognition of the fact that the forces of impact exerted on the seating ring by the valve body and which result in destruction of the ring and which for that reason are normally restricted can be used positively with suitable design and choice of material of the ring.

The non-return valve according to the invention is characterized in that the ring, which is manufactured from a plastically deformable starting material, in the starting position has a thickness measured normal to the axis which increases when moving in the axial direction from the seating surface toward the seat in such manner that simultaneously the inner diameter of the ring decreases and the outer diameter of the ring increases. The seating surface experiences a permanent increase in area as a result of plastic deformation of the ring by the valve body when the closing pressure exceeds a given minimum value.

In this manner a non-return valve is obtained in which the seating ring at the beginning of the operating lifetime experiences a further flattening of the seating surface by the impact processes at comparatively high closing pressures. This results in a more readily sealing co-operation between valve body and ring in the closed condition of the valve and thus in a reduced leak. As a result of the described variation of the ring thickness, the material displacement associated with the further flattening takes place in such manner that no danger of crumbling away of the ring occurs. The valve thus has a long lifetime. High closing pressures are now possible without detrimental results. This means that the non-return valve can have a spring of great rigidity and high pretension so that a short closing time in combination with a long lifetime of the valve is realized.

Owing to the admissible high closing pressures the non-return valve is now extremely suitable also for use in duct systems in which a medium under a high pressure is present and which high pressure medium provides a large medium pressure differential across the valve body upon closing the valve.

In a favorable embodiment of the non-return valve according to the invention, the points of intersection of a plane through the axis of the ring with the inner and outer surface of the ring constitute arcs of a common circle.

Plastic deformation of the ring with such a starting shape provides an extremely favorable final shape in which the sealing effect between the seating surface of the ring and the co-operating surface of the valve body is optimum and crumbling away of the ring is substantially impossible.

In a preferred embodiment of the non-return valve the valve body consists of a nickel-chromium steel with the indication according to the DIN standard 35 NiCr18 and 35 NiCrMo16, respectively (Vickers hardness: 490–580 kg/mm$^2$) and the seating ring and the valve seating, respectively, are manufactured from a chromium-nickel steel indicated in the DIN standard by 36 CrNiMo4 and 30 CrNiMo8, respectively (Vickers hardness: 255–300 kg/mm$^2$).

It has been found that the combination of these two starting materials provides a non-return valve which excellently satisfies all requirements of short closing time, minimum leak and long lifetime and which can be particularly readily applied in systems in which high medium pressures and possibly comparatively high medium temperatures prevail.

BRIEF DESCRIPTION OF THE DRAWINGS

The invention will be described in greater detail with reference to the drawing.

DESCRIPTION OF THE PREFERRED EMBODIMENT

Figure 1:
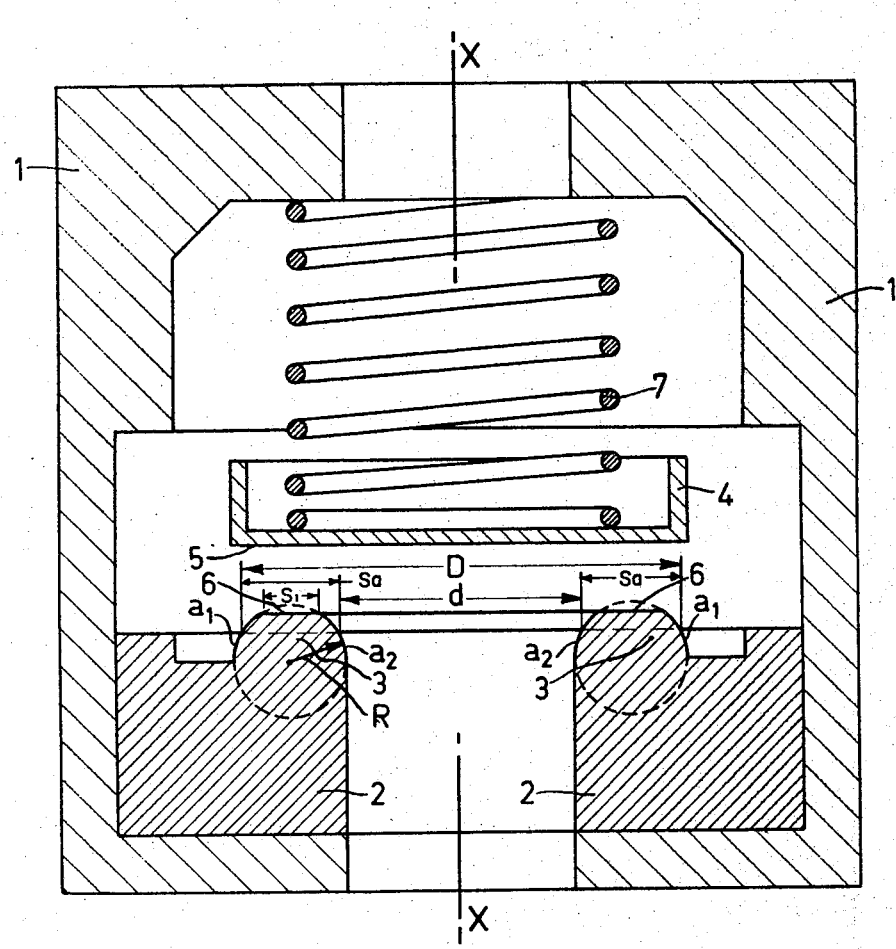
FIGS. 1 and 2 of the drawings show diagrammatically and not to scale by way of example two embodiments of the non-return valve.

Reference numeral 1 in FIG. 1 denotes a housing in which a valve seat 2 is arranged which is provided with an upright seating ring 3. A valve body 4 is flat on its side 5 facing the seat 2 and co-operates on said side with a flat seat surface 6 of the seat ring 3. The seat 3 forms one assembly with the seat 2 and is of the same material. Seat ring 3 and seat 2, respectively, are of a plastically deformable starting material which has a less hard than the material of the valve body 4. Furthermore a compression spring 7 is present which exerts on the valve body 4, a force in the direction of the seating ring 3. Compression spring 7 has a large spring constant (stiff spring) and a high pretension. The non-return valve thus is normally closed.

The seating ring 3 has a thickness $S_1$ normal to axis z, which thickness increases to $S_2$ when moving in the axial direction from the seating surface 6 toward the seat 2. The inner diameter $d$ of the ring decreases in the said direction, in the figure from top to bottom. Simultaneously, the outer diameter $D$ of the ring increases in the said direction. The variation of the inner and outer diameters of the ring is such that in a cross-section through the axis of the ring, the points of intersection of the plane through the axis of the ring with the inner and outer surface of the ring provides two arcs of circles a1 and a2 of a common circle having radius R.

At the beginning of the operating lifetime of the valve, when the seating ring material is still in the starting condition, the flow limit of the plastically deformable starting material of the ring above a given minimum closing pressure is exceeded with each impact of the valve body 4 on the seating surface 6 of the seating ring 3, as a result of which a permanent deformation occurs. The minimum required closing pressure can be supplied by the compression spring 7 but also, and even mainly, by medium pressure in a medium duct in which the valve is incorporated. As a result of the plastic deformation, the seating surface 6 increases in area, in which the flatness thereof is not only maintained but is even favorably influenced and provides a better seal of the valve when the side 5 of the valve body 4 bears against the seating surface 6.

After the non-return valve has been in operation for some time and a certain number of impacts has taken place, an equilibrium situation has arisen. On the one hand the pressure stress in the seating surface 6 has decreased as a result of the larger area of said seating surface; on the other hand the ring material at the area of the seating surface has been reinforced as a result of the permanent deformation.

Since in the starting position the seating ring 3 has a thickness that is wider at the bottom as one moves in the axial direction proceeding from the seat surface 6 to the seating 2, which thickness varies according to arcs of circles and manifests itself both on the inside and on the outside of the ring, the displacement of material of the seating ring as a result of the plastic deformation occurs in such manner that at the area of the seating surface, material will not project beyond the ring either on the inside or on the outside of the ring. The ultimate shape of the ring is such that no material of the ring crumbles away. In addition to the readily sealing effect in the closed condition of the valve, the valve thus has a long lifetime at high closing pressures and short closing times.

Figure 2:
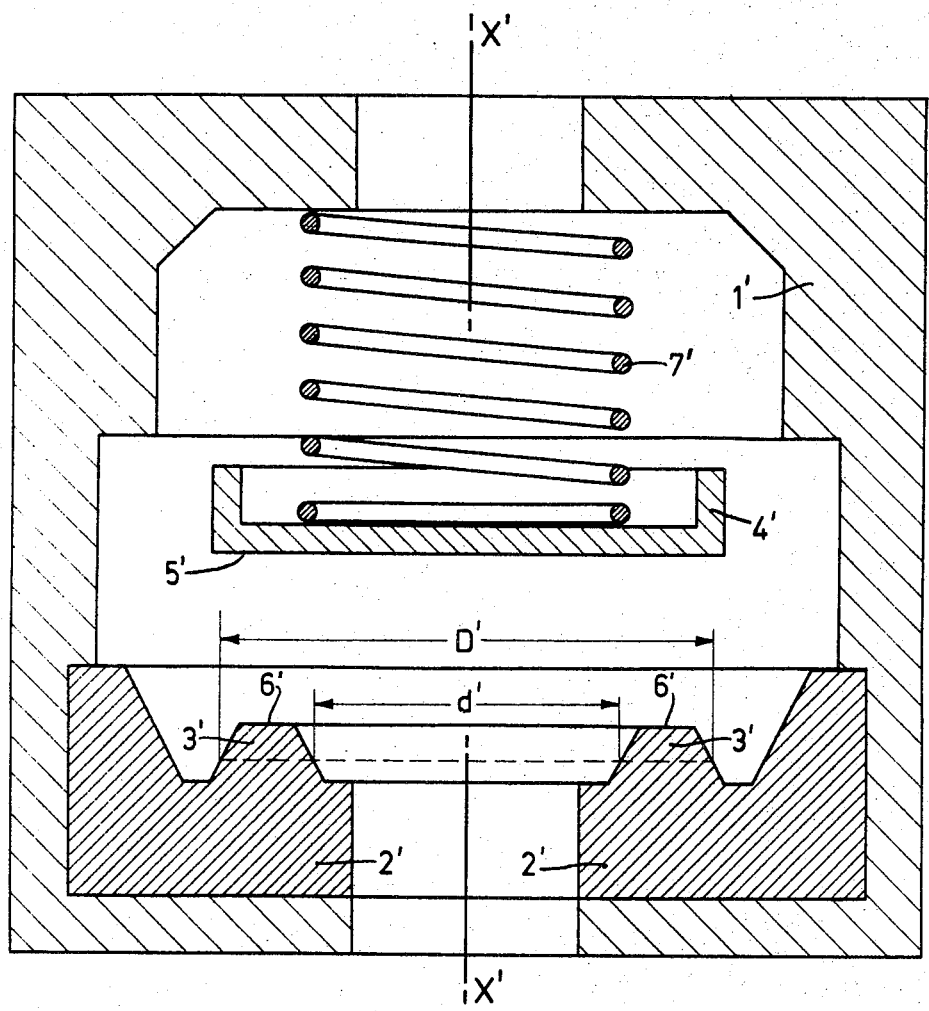

The non-return valve shown in FIG. 2 is for the greater part equal to that of FIG. 1. Therefore the same reference numerals but with primes (1) are used for corresponding components. The only difference is that the seating ring 3' in the present case in the starting position has bevelled edges with a ring thickness which increases linearly (normal to said axis x'—x') both on the inside and on the outside of the ring when moving in the axial direction from the seating surface toward the seat 2'.

In this case also plastic deformation of the seating ring 3' by the valve body 4' results in a permanent larger area of the flat seating surface 4'. In this case a final shape of the ring is also obtained in which no material of the edge of the seating surface crumbles away and a readily sealing cooperation exists between the side 5' of the valve body 4' and the seating surface 6', so a minimum leak.

With a suitably chosen greater hardness of the valve body there exists no danger for said valve body to experience deformation during the impacts with the seating ring. The fact that the valve body is slightly movable in the radial direction is also favorable in this respect since as a result of this it is not always the same part of the side 4' of the valve body which impacts against the sealing surface 6'.

What is claimed is:

1. In a non-return valve including a housing defining therein a passage with two spaced discharge apertures, a valve body having a flat side for seating, and being movable between a closed position and an open position, and means for moving said valve body between said positions, the improvement in combination therewith of a valve seat comprising an annular body situated in said housing and sealingly blocking said passage except for a duct extending through said body, said valve seat having a top side including an aperture therein which is one outlet of said duct, said valve body when in closed position having its flat side cooperating with said top side of the seat for blocking said duct aperture, said top side being a surface defined as: a first inner circular part adjacent and outward of said aperture, a second middle circular part adjacent and outward of the first part, and a third outer circular part adjacent and outward of the second part, these first, second and third parts (when said body is cut by a vertical plane through the axis of said duct) defining on each side of said axis a profile wherein said second part is a generally horizontal line, the first part is a convex curve projecting above said line, the curve having a top that is flat and generally horizontal to said axis, the third part is a generally rectangular area projecting above said line to a height less than said curved part, and said valve body flat part having diameter similar to that of said first part for cooperation therewith.

2. Apparatus according to claim 1 wherein said convex curved part comprises a hemispherical curve, except for the flat top thereof.

3. Apparatus according to claim 1 further comprising spring means for urging said valve body to move toward said top surface of said valve seat.

4. Apparatus according to claim 2 wherein said third part height is approximately one-half the radius of said circular curve.

5. A non-return valve according to claim 1 wherein the valve body comprises a nickel-chromium steel with the indication of DIN-standard 35 NiCr18 and 35 NiCrMo16, respectively (Vickers hardness $H_v$ 490–580 kg/mm$^2$), and the ring comprises a chromium-nickel steel with indication of DIN standard 36 CrNiMo4 and 30 CrNiMo8, respectively ($H_v$: 255–300 kg/mm$^2$).

* * * * *

PO-1050
(5/69)

UNITED STATES PATENT OFFICE
CERTIFICATE OF CORRECTION

Patent No. 3830254      Dated August 20, 1974

Inventor(s) AREND HARREWIJNE ET AL

It is certified that error appears in the above-identified patent and that said Letters Patent are hereby corrected as shown below:

In the title under "Foreign Priority Data"

delete "722535" and insert --7202535--

Col. 4, line 47, "(1)" should be --(')--; (prime)

Signed and sealed this 31st day of December 1974.

(SEAL)
Attest:

McCOY M. GIBSON JR.          C. MARSHALL DANN
Attesting Officer            Commissioner of Patents